United States Patent [19]

Collins, Jr.

[11] Patent Number: 4,926,481
[45] Date of Patent: May 15, 1990

[54] COMPUTER ACCESS SECURITY CODE SYSTEM

[75] Inventor: Earl R. Collins, Jr., La Canada, Calif.

[73] Assignee: The United States of America as represented by the Administrator of the National Aeronautics and Space Administration, Washington, D.C.

[21] Appl. No.: 279,630

[22] Filed: Dec. 5, 1988

[51] Int. Cl.⁵ .............................................. H02L 9/04
[52] U.S. Cl. ....................................... 380/25; 380/45; 380/49
[58] Field of Search ................................. 380/23–25, 380/49–50, 45

[56] References Cited

U.S. PATENT DOCUMENTS

| | | | |
|---|---|---|---|
| 3,798,605 | 3/1974 | Feistel | 380/25 |
| 3,984,637 | 10/1976 | Caudill et al. | 179/2 DP |
| 4,195,200 | 3/1980 | Feistel | 380/50 |
| 4,218,738 | 8/1980 | Matyas et al. | 380/25 |
| 4,238,853 | 12/1980 | Ehrsam et al. | 380/49 |
| 4,264,782 | 4/1981 | Konheim | 380/24 |
| 4,271,482 | 6/1981 | Giraud | 364/900 |
| 4,310,720 | 1/1982 | Check, Jr. | 380/25 |
| 4,458,312 | 6/1984 | Stranko et al. | 364/200 |
| 4,486,828 | 12/1984 | Kitamura et al. | 364/200 |
| 4,589,092 | 5/1986 | Matick | 364/900 |
| 4,604,688 | 8/1986 | Tone | 364/200 |
| 4,652,698 | 3/1987 | Hale et al. | 380/24 |

OTHER PUBLICATIONS

Electronic Signature for Use with Data Encryption Standard, IBM Technical Disclosure Bulletin, vol. 24, No. 5, Oct. 1981, by S. M. Matyas et al.
An Overview of Handheld Password Generators, "Network Security", Mar. 1986.

Primary Examiner—Salvatore Cangialosi
Attorney, Agent, or Firm—Thomas H. Jones; John R. Manning; Charles E. B. Glenn

[57] ABSTRACT

A security code system for controlling access to computer and computer-controlled entry situations comprises a plurality of subsets of alpha-numeric charcters disposed in random order in matrices of at least two dimensions forming theoretical rectangles, cubes, etc., such that when access is desired, at least one pair of previously unused character subsets not found in the same row or column of the matrix is chosen at random and transmitted by the computer. The proper response to gain access is transmittal of subsets which complete the rectangle, and/or a parallelepiped whose opposite corners were defined by first groups of code. Once used, subsets are not used again to absolutely defeat unauthorized access by eavesdropping, and the like.

20 Claims, 3 Drawing Sheets

FIG. 4

| 24 | 2  | 16 | 12 | 11 | 25 | 1  | 27 |
|----|----|----|----|----|----|----|----|
| 15 | 26 | 17 | 0  | 5  | 23 | 13 | 7  |
| 28 | 31 | 19 | 8  | 18 | 4  | 21 | 3  |
| 14 | 10 | 30 | 9  | 29 | 20 | 22 | 6  |

FIG. 5

| 24 | 2  | 16 | 12 | 11 | 25 | 1  | 27 |
|----|----|----|----|----|----|----|----|
| 15 | 26 | 17 | 0  | 5  | 23 | 13 | 7  |
| 28 | 31 | 19 | 8  | 18 | 4  | 21 | 3  |
| 14 | 10 | 30 | 9  | 29 | 20 | 22 | 6  |

COMPUTER ACCESS SECURITY CODE SYSTEM

ORIGIN ON THE INVENTION

The invention described herein was made in the performance of work under a NASA contract, and is subject to the provisions of Public Law 96-517(35 USC 202) in which the Contractor has elected not to retain title.

TECHNICAL FIELD

The invention relates to computer controlled security access systems employing passwords to gain access and, more particularly, to a security access control system comprising, controlling computer means for controlling access to an object; remote station means operably connected to the controlling computer means for inputting access information to the controlling computer means; a pair of matching first matrices of passwords located at the controlling computer means and the remote station means, respectively, each the first matrix of passwords comprising a plurality of individually unique symbols arranged in rows and columns to define a first virtual plane; and, access logic means located at the controlling computer means and operably connected to read from and write to its associated the first matrix of passwords, for transmitting a first pair of passwords from its first matrix to the remote station means when the remote station means attempts to gain access, the first pair of the passwords being chosen from different the columns and rows whereby they define diagonally opposite corners of a rectangle in the first virtual plane, for receiving a first pair of passwords transmitted from the remote station means as obtained from the remote station means' first matrix, for comparing the first pair of passwords transmitted from the remote station means to the passwords located in the controlling computer means' first matrix at corners of the rectangle other than those defined by the transmitted first pair of passwords, for granting access if the compared passwords are a match, and for denying access if the compared passwords are not a match.

In the preferred embodiment, the access logic means additionally includes means for marking ones of the passwords within the associated first matrix employed for any purpose as "used" and means for not choosing a password marked as used for transmission to the remote station means. The preferred embodiment additionally comprises, a pair of matching second matrices of passwords located at the controlling computer means and the remote station means, respectively, each second matrix of passwords comprising a plurality of individually unique symbols arranged in rows and columns to define a second virtual plane. Additionally, the access logic means includes, secondary checking means disposed before the means for granting access if the compared passwords are a match, for transmitting a second pair of passwords from its second matrix to the remote station means, the second pair of passwords being chosen from different columns and rows whereby they define diagonally opposite corners of a rectangle in the second virtual plane which is located in a plane of a parallelepiped containing the compared and matched passwords at diagonal corners of one side thereof, for receiving a second pair of passwords transmitted from the remote station means as obtained from the remote station means' second matrix, for comparing the second pair of passwords transmitted from the remote station means to the passwords located in the controlling computer means' second matrix at corners of the rectangle other than those defined by the transmitted second pair of passwords, for granting access if the compared second passwords are a match, and for denying access if the compared second passwords are not a match.

BACKGROUND ART

In the field of computers, security is a major area of concern in many applications. Horror stories abound of so-called "hackers" gaining unauthorized access to various computer systems. The problem exists for both commercial and military systems. Unauthorized access to a computer system can give the accessing party the ability to mis-transfer funds, modify records, and see materials of a classified nature, just to name a few things.

In the March 1986 issue of Network Security in an article entitled "An Overview of Handheld Password Generators", the statement is made that, "The most pervasive element of computer security is the password or Personal Identification Number (PIN). It has long been viewed as one of the weakest links in maintaining system integrity. As the best available alternative, thousands of organizations have adopted traditional password schemes knowing full well that the weaknesses represent a major vulnerability to their system security.

In the early 1980s scores of engineers and entrepreneurs focused on techniques to identify people based on physical or behavioral characteristics. In addition, a few companies designed a new class of products called handheld password generators." (Emphasis added)

The article then goes on to describe various forms of these handheld password generators as are presently being made commercially available by various companies.

Figures 1, 2, 3:
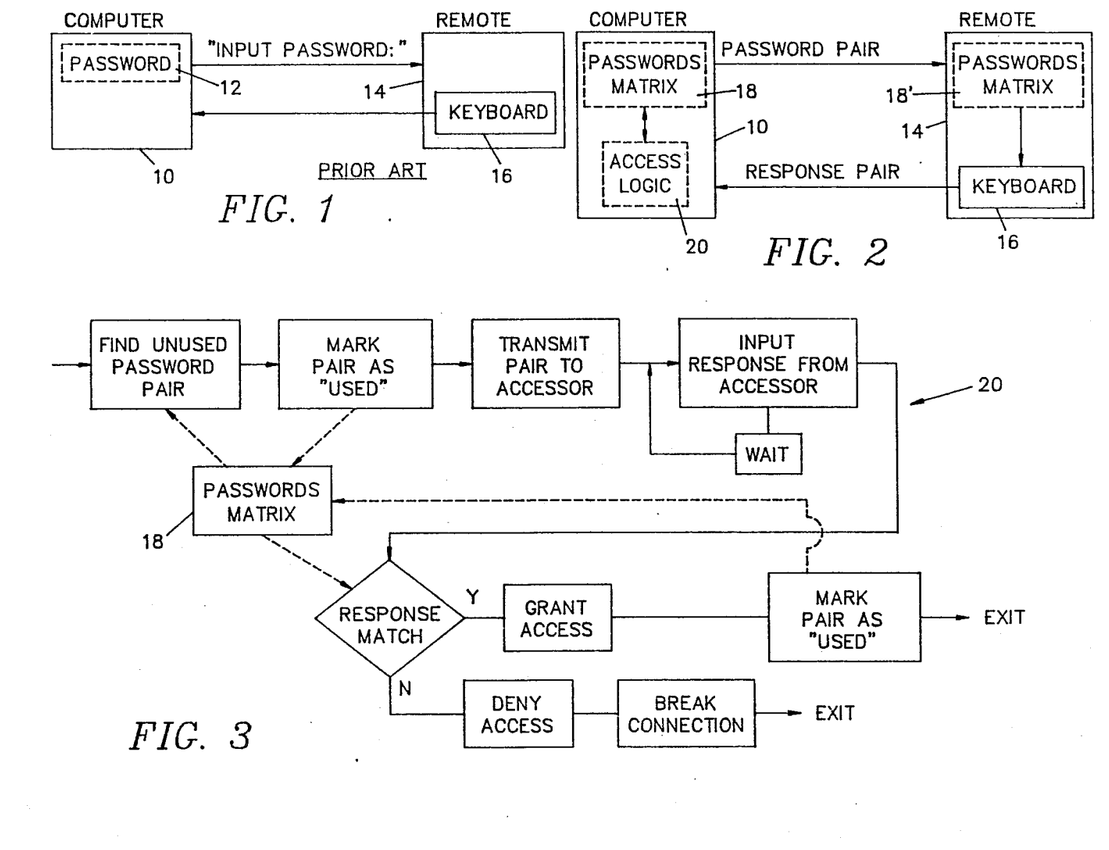
FIG. 1 is a simplified drawing depicting a prior art approach to using passwords to gain access to a computer controlled environment wherein the user inputs a password to the controlling computer through a keyboard and the controlling computer compares the password as input to a pre-stored password.
FIG. 2 is a simplified drawing of a computer controlled access system according to one possible embodiment of the present invention.
FIG. 3 is a flowchart showing one possible logic pattern to be employed in a computer controlled security access system according to the present invention.

One of the big problems with traditional password schemes is that they typically use a single password comprised of a sequence of alpha-numeric characters to gain access to the system as depicted in FIG. 1. The access-controlling computer 10 contains a pre-defined password 12. When a user at a remote station 14 tries to gain access, the computer 10 has typically sent the message "INPUT PASSWORD:" and is waiting for the user to input the password through the keyboard 16. If the proper password is input (i.e. it compares to the password 12) access is granted. If not, the computer 10 loops back to the point in its logic where the "INPUT PASSWORD:" message is output. The stored password 12 may be changed periodically; but, a given password is typically in place for a substantial period of time. Moreover, the access programming sequence is typically a simple loop that asks for the password and returns to the beginning of the loop if the improper password is entered, repeating the process over and over again until the proper password is provided or until the person trying to gain access gives up. Thus, anyone trying to gain unauthorized access has unlimited opportunity to try various passwords. In such an environment, a typical approach is to tie the input sequence to a computer generating various passwords. The computer employs a pseudo random password generator to input to the password checking loop until the proper password is stumbled upon. For a human operator, such an approach would be virtually unthinkable. For a computer, it is everyday business as usual. The same approach is used to find the telephone number for remote access to computer systems. The hacker simply sets up the computer to sequentially try telephone numbers and note those for which a computer modem carrier signal is returned. The hacker can then try those numbers at a later time to determine ones of possible interest for which unauthorized access will be tried. Such clandestine attempts at gaining entry or system information are typically tried at night when there is no one in the area of the computer and hundreds of thousands of combinations can be tried without alerting operating personnel.

Another limiting factor of typical password schemes is the vulnerability of the password to detection. In many cases, an unsophisticated user who has difficulty remembering the password simply writes it down somewhere in the area—often on the bezel area of the terminal display or keyboard. Unthinkable as it seems, there are people who write their PIN number on their credit cards and ATM bank cards because they cannot remember them. In the alternative, when users have the opportunity to choose the password or their PIN number, they often choose something that they have memorized or that is already written down. Telephone numbers, driver's license numbers, social security numbers, birth dates, and the like, are typical candidates. Thieves and unauthorized computer accessors know this and try those alpha-numeric sequences first.

Passwords can also be obtained in other ways. When a user enters his or her password, they seldom check to see if someone is looking over their shoulder and watching the sequence as entered. A high power telescope can be used to watch through a window from a considerable distance and allow the password to be seen as it is entered. Where the password is entered from a remote terminal over a telephone line or local area network (LAN) by means of a modem, the password can be detected electronically as it passes along the telephone line or LAN. Of course, the more important the access is to the system, the more sophisticated the equipment that can be brought to bear on finding out the password. In cases of espionage and national security, the world of James Bond and "007" is a reality that can be made readily available to operatives. The hand-held password generators of the above-described article are intended to help break the pattern of password detection by, for example, inputting the password directly to the computer through an optical interface which generates no detectable radio frequency emissions and whose input sequence cannot be seen easily when the device is used.

While entry to the computer itself is the most obvious area of need, computer-controlled access environments where a computer controls the opening of doors, vaults, etc., have a similar need.

Since the password is still the "best available alternative" as quoted above, what is needed is a system for password verification which is adaptable to user log-on from a distance over telephone lines or a LAN as well as locally, in which there is a bi-directional interchange between the computer and the user which is unbreakable even if some or all of the information of one or more log-ons is obtained by unauthorized parties.

STATEMENT OF THE INVENTION

Accordingly, it is an object of this invention to provide a unique system for password verification in computer and other entry situations which is adaptable to use from a distance over telephone lines or a LAN as well as locally, in which there is a bi-directional interchange between a controlling computer and the user which is unbreakable even if some or all of the information of one or more prior entries is obtained by unauthorized parties.

It is another object of this invention to provide a unique system for password verification in computer and other entry situations which is adaptable to use from a distance over telephone lines or a LAN as well as locally in which the controlling computer breaks contact with the user on any instance where the inability to continue with a proper sequence indicates possible attempted access by an unauthorized party.

Other objects and benefits of the present invention will become apparent from the description which follows hereinafter when taken in conjunction with the drawing figures which accompany it.

DETAILED DESCRIPTION OF THE INVENTION

While the description which follows focuses on passwords as an entry to a computer system itself, as mentioned above and as will be readily appreciated by those skilled in the art, the techniques to be described hereinafter would be equally applicable to any entry situation in which a computer is controlling access through the entry of a password. Such related uses are, therefore, to be considered within the scope and spirit of the present invention in determining the breadth of the claims which follow.

The solution implemented by the present invention is to employ a sequence of code symbols that are changed at every access attempt, to defeat eavesdropping, and to arrange the pattern of symbols such that a selection of code challenges must be answered exactly and immediately by a password with bears an artificial relationship with the challenge, derived from placement within matrices of at least two, and preferably more, dimensions. It should be noted that the use of matrices for the storage of access codes is not new and such, per se, is not considered to be a point of novelty of the present invention. In the prior art use of matrices for such applications, however, the matrix is merely employed in the manner of a table such that different passwords can be picked up from different locations according to a pre-established plan (e.g. pseudo randomly). In the alternative, a changing code sequence, when employed, is more typically calculated in each instance by employing a pseudo random code generation algorithm. In the present invention, it is the manner in which the data is retrieved from the matrix or matrices for use which imparts the novelty.

A system implementing the present invention is shown in simplified form in FIG. 2. To implement the present invention, the computer 10 being accessed (i.e. the controlling computer) and the user at the remote station 14 from which access is attempted must be in possession of identical randomly-distributed code groups which are arranged in password matrices 18 of, preferably, three dimensions, or higher. In this regard, it should be noted that the term "remote station" can refer to a truly remote site located at some distance from the computer 10 or, in the alternative, a local input device (keyboard, handheld code generator, etc.) inputting directly to the computer 10. From these matrices, a pairs of code groups may be chosen as part of a challenge sequence. These code groups must not lie in identical rows, columns, etc. Thus, they can be considered, by definition, to lie at diagonally opposite corners of a virtual rectangular solid within the overall cubical matrix. The proper password response completes the definition of the corners of the rectangular solid. This approach can be implemented to several levels of sign and countersign as will be described hereinafter. As depicted in FIG. 2, the passwords matrix 18 in the computer 10 is accessed bi-directionally by the access logic 20 to be described hereinafter. The passwords matrix 18' at the remote station 14 may be in the form of an external source (book, floppy disk, magnetic tape, etc.) which is consulted manually by the user or, alternatively, may be incorporated into a remote access device, such as the handheld password generators mentioned above. In either case, it is preferred that the passwords matrices 18, 18' be implemented in the form of easily replaceable devices (books, smart cards, floppy disks, magnetic tapes, etc.) so that they can be changed frequently for reasons which will become apparent shortly. In any event, at the remote station 14 the proper contents from the passwords matrix 18' as retrieved in the manner to be described is either input through the keyboard 16 by the user or sent directly to the computer 10 in the case of a password generator type of device.

Figure 4:
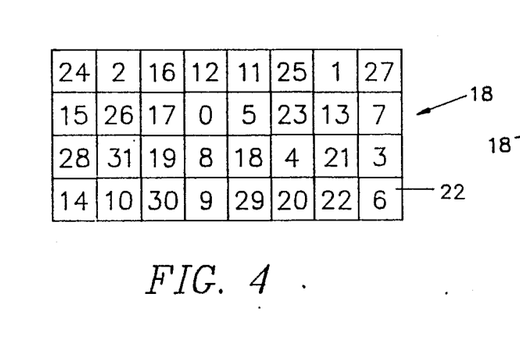
FIG. 4 is a simplified two-dimensional matrix of passwords of the type that could be employed in the present invention.
Figure 5:
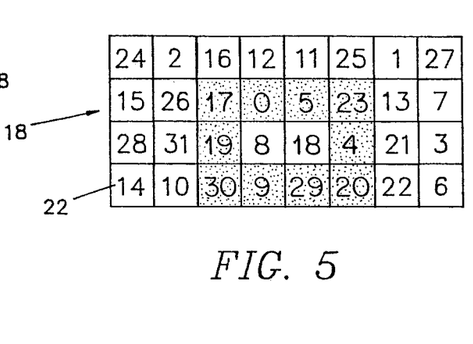
FIG. 5 is the matrix of FIG. 4 with the rectangle containing the four passwords employed in a typical access as described by way of example shown by shading.

The operation of the present invention and one form of associated logic for the access logic 20 is depicted in FIGS. 3-5. The logic flow diagram appears in FIG. 3 while FIG. 4 depicts a simplified, two-dimensional version of a passwords matrix 18, 18' for purposes of the example. Alpha-numeric character groups, i.e. code sequence subsets 22, are disposed randomly within the matrix, as shown. In this regard, the matrices can be constructed conveniently employing a random code generation algorithm according to techniques well known in the art which form no part of the present invention per se. When the access-controlling computer 10 is queried by the remote station 14 during access, it sends out a pair of code subsets 22 not in the same row or column of the matrices 18 18', which thus define opposite corners of a rectangle (or square). This constitutes the "challenge", in military parlance, which must be properly answered by the password, i.e., that pair of code subsets 22 which define the remaining corners of the rectangle. For example, as depicted by the shaded "rectangle" of FIG. 5, if the challenge code sequence is 20, 17, the proper response would be 23, 30 employing the matrix configuration of FIG. 4.

As illustrated in FIG. 3, in accomplishing the foregoing, the access logic 20 first finds an unused password pair (e.g. the 20, 17 pair of the example above) in its associated matrix 18. The pair is marked as "used" within the matrix 18 and transmitted to the remote station 14. Note that once a pair is selected and used for any purpose, it is considered as "used" and never used again. It is this approach which absolutely defeats the "eavesdropper" who learns a password by any means. It is also the reason why it is preferred that the matrices 18, 18' be on an easily replaceable medium. Unless the matrix size is exceptionally large, frequent access will consume the avaible (non-used) pairs of code sequence subsets 22 quite rapidly. Once the logic 20 has transmitted the password pair to the remote station 14, it waits for a response. Preferably, although not shown in the logic flow, the access sequence should be abandoned after a given length of time rather than leaving the system in an open and waiting state for an unlimited amount of time. This could be accomplished by timing techniques well known to those skilled in the art and by then branching to the "deny access" path of the logic if the time limit for input is exceeded. Once a response is received, the logic 20 checks for a match with the password pair which will complete the rectangle (i.e. 23, 30 in the above-described example). If there is a match, access is granted and the completing password pair is marked as "used" in the matrix 18. If the response is a non-match to the proper response, access is denied and the connection to the remote station 14 is broken. While an immediate breaking of the connection is preferred for maximum security purposes, on could repeatedly loop back to the beginning as in the prior art or maintain a counter of tries and break the connection after "n" unsuccessful attempts, if desired.

Figure 6:
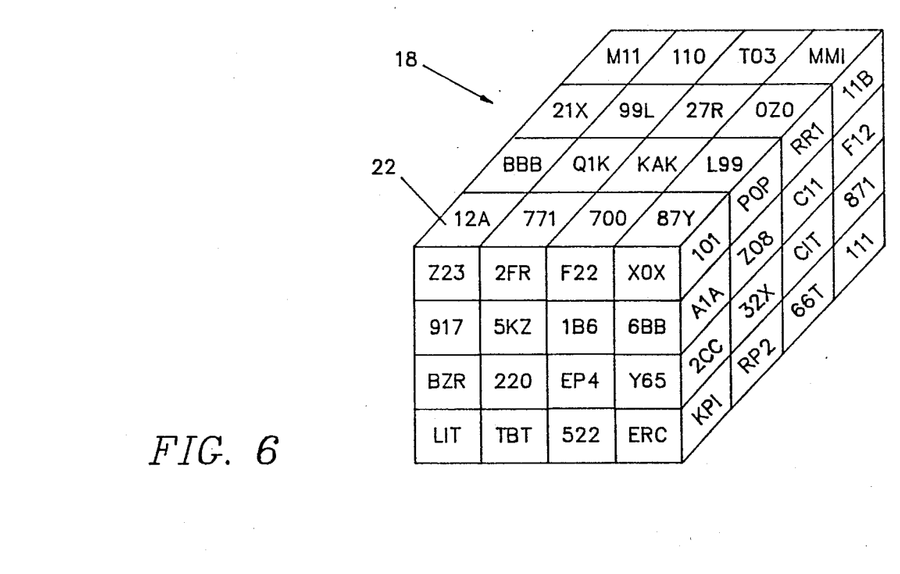
FIG. 6 is a simplified three-dimensional matrix of passwords of the type that could be employed in the present invention shown as a cube for ease of understanding.
Figures 7, 8:
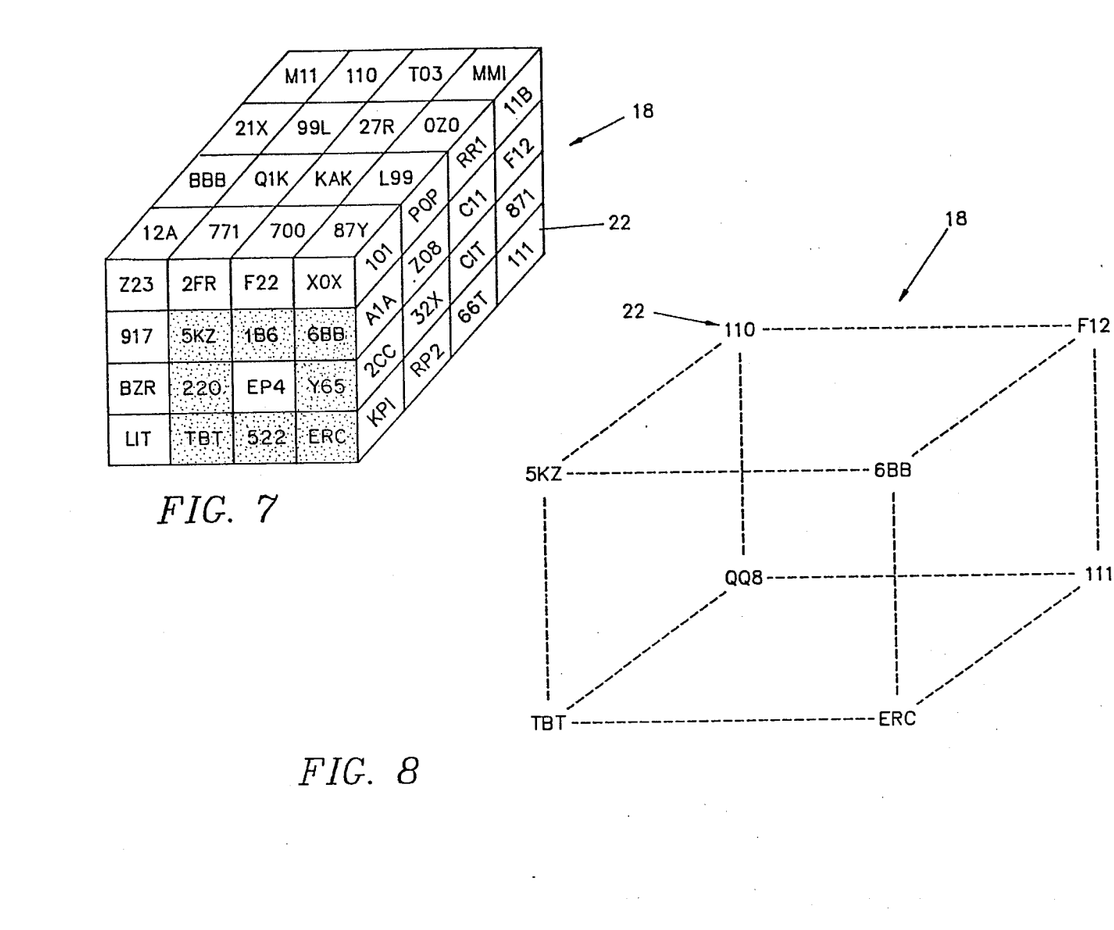
FIG. 7 is the matrix of FIG. 6 with the rectangle containing four passwords employed in a typical access as described by way of example shown by shading.
FIG. 8 is the matrix of FIGS. 6 and 7 in ghosted form to show otherwise unseen passwords employed in the example.

FIG. 6 illustrates a small, three-dimensional matrix 18, 18', arranged as a cube for easy visualization and illustration. In the preferred implementation, the actual "cube" would be a group of six matrices, associated by axes—one for each face of the cube. With three dimensions, the access procedure can follow the military password system of challenge, sign and countersign. This is an alternate approach to the prior example where the password pair interchange was initiated by the computer 10. In this approach, it is the remote station 14 which initiates the first password pair. When the remote station 14 attempts access, it sends out two code sequence subsets 22 on the same face (matrix) of the cube, but not in the same row or column as in the case of the prior, two-dimensional example. For example, assume the caller transmits 5 KZ, ERC as depicted by the shaded rectangle of FIG. 7. These would be chosen at random by the caller, and, of course, should be chosen from those code sequence subsets 22 not previously used. The receiver (i.e. computer 10) completes the rectangle, in this example by sending back TBT, 6BB as should be apparent from FIG. 7 as being the opposite corners of the rectangle. This identifies the station reached, so the caller (i.e. remote station 14) knows he has reached the desired destination to which access is desired. In addition to completing the first rectangle as an acknowledgement, the receiver sends out two more code sequence subsets 22 which are chosen to define the corners of a parallelepiped based on the rectangle just established. In the example of FIGS. 6-8, F12, QQ8. The latter code subset 22 is not visible in FIGS. 6 and 7; but, can be seen with reference to the ghosted drawing of FIG. 8. To complete the access sequence successfully, the user at the remote station 14 must respond with the last two corners, or 111, 110. Once this entire particular sequence has been used, it cannot be used again as all the code subsets 22 employed therein are marked as "used" in the process. As mentioned earlier, it is this approach that absolutely defeats any later access due to eavesdropping; that is, even if the password sequence in any particular instance is learned, an attempt to reuse it will end in failure as the system never uses the same sequence twice. If a hacker attempts to respond with a sequence of randomly-generated code sequences, this can be defeated by cutting off the connection at the first, or second, or even third wrong response, as mentioned earlier. If the hacker attempts reconnection, the challenge will be different each time; thus, chances of randomly-generated responses being correct are miniscule at best (in actuality being virtually nonexistent), especially when a second response is required as in the second example above. It is preferred that the basic floppy disk, etc., "code book" defining the matrices 18, 18' be changed often, to prevent loss of too many choices, and to improve security. For a higher level of security, high dimensional matrices may be used, in the same manner that cubes are compounded into hypercubes in modern concurrent processing. Note that in instances where the remote station 14 is initiating a transmission of code subset pairs, it is preferred that the contents of the remote station's matrix 18' be flagged as "used" when used to prevent erroneous transmissions. When only the computer 10 initiates transmission sequences, it is, of course, unnecessary to flag the remote station's matrix 18'.

It should also be appreciated by those skilled in the art that a multidimensional sequence initiated by the computer 10 could be employed whereby the remote station would have to provide the proper response pair twice (or even more if maximum security was desired). In such case, the computer 10 would, in each instance, send a pair of code subsets 22 representing diagonally opposite corners of a rectangle located in the virtual plane of one of its matrices 18. The remote station 14 would have to respond with the proper other two corner code subsets 22 in order for the access sequence to continue. At each successful stage, the computer 10 would choose and transmit another pair of code subsets 22 representing diagonally opposite corners of a rectangle located in a next virtual plane associated with another of its matrices 18 as determined by its association with a parallelepiped including the previous rectangle. In this way, the computer 10 could move from matrix to matrix through multiple dimensions until access was granted or denied.

I claim:

1. In a security access control system wherein a user at a remote station requires approval from a controlling computer to gain access, the improvement comprising:
   (a) a pair of matching first matrices of passwords located at the controlling computer and the remote station, respectively, each said first matrix of passwords comprising a plurality of individually unique symbols arranged in rows and columns to define a first virtual plane; and,
   (b) access logic means located at the controlling computer and operably connected to read from and write to its associated said first matrix of passwords,
      (b1) for transmitting a first pair of said passwords from its said first matrix to the remote station when the remote station attempts to gain access, said first pair of said passwords being chosen from different said columns and rows whereby they define diagonally opposite corners of a rectangle in said first virtual plane,
      (b2) for receiving a first pair of said passwords transmitted from the remote station as obtained from the remote station's said first matrix,
      (b3) for comparing said first pair of passwords transmitted from the remote station to the said passwords located in the controlling computer's said first matrix at corners of said rectangle other than those defined by said transmitted first pair of said passwords,
      (b4) for granting access if said compared passwords are a match, and
      (b5) for denying access if said compared passwords are not a match.

2. The improvement to a security access control system of claim 1 wherein said access logic means additionally includes:
   (a) means for marking ones of said passwords within the associated said first matrix employed for any purpose as "used"; and,
   (b) means for not choosing a said password marked as used for transmission to the remote station.

3. The improvement to a security access control system of claim 1 and additionally comprising:
   (a) a pair of matching second matrices of passwords located at the controlling computer and the remote station, respectively, each said second matrix of passwords comprising a plurality of individually unique symbols arranged in rows and columns to define a second virtual plane; and wherein said access logic means additionally includes,
   (b) secondary checking means disposed before said means for granting access if said compared passwords are a match,
      (b1) for transmitting a second pair of said passwords from its said second matrix to the remote station, said second pair of said passwords being chosen from different said columns and rows whereby they define diagonally opposite corners of a rectangle in said second virtual plane which is located in a plane of a parallelepiped containing said compared and matched passwords at diagonal corners of one side thereof,
      (b2) for receiving a second pair of said passwords transmitted from the remote station as obtained from the remote station's said second matrix, (b3) for comparing said second pair of passwords transmitted from the remote station to the said passwords located in the controlling computer's said second matrix at corners of said rectangle other than those defined by said transmitted second pair of said passwords, (b4) for granting access if said compared second passwords are a match, and (b5) for denying access if said compared second passwords are not a match.

4. The improvement to a security access control system of claim 3 wherein said access logic means additionally includes:

(a) means for marking ones of said passwords within the associated said second matrix employed for any purpose as "used"; and, (b) means for not choosing a said password marked as used for transmission to the remote station.

5. The improvement to a security access control system of claim 1 and additionally comprising:

(a) a pair of matching second matrices of passwords located at the controlling computer and the remote station, respectively, each said second matrix of passwords comprising a plurality of individually unique symbols arranged in rows and columns to define a second virtual plane;

(b) the remote station including query logic for transmitting a query pair of said passwords from its said first matrix to the controlling computer to initiate an access attempt, said query pair of said passwords being chosen from different said columns and rows whereby they define diagonally opposite corners of a rectangle in said first virtual plane; and wherein said access logic means additionally includes, (c) preliminary checking logic disposed before said means for transmitting a first pair of said passwords the remote station, (c1) for receiving said query pair of said passwords transmitted from the remote station, (c2) for using said query pair of passwords transmitted from the remote station to find the said passwords located in the controlling computer's said first matrix at two corners of said rectangle other than those defined by said transmitted query pair of said passwords, (c2) for transmitting said passwords from said two other corners to the remote station, and wherein additionally, (d) said first pair of said passwords is chosen from the controlling computer's said first matrix, said first pair of said passwords being chosen from different said columns and rows whereby they define diagonally opposite corners of a rectangle in said second virtual plane which is located in a plane of a parallelepiped containing said four query passwords at corners of one side thereof.

6. A security access control system comprising:

(a) controlling computer means for controlling access to an object;

(b) remote station means operably connected to said controlling computer means for inputting access information to said controlling computer means;

(c) a pair of matching first matrices of passwords located at said controlling computer means and the remote station means respectively, each said first matrix of passwords comprising a plurality of individually unique symbols arranged in rows and columns to define a first virtual plane; and, (d) access logic means located at said controlling computer means and operably connected to read from and write to its associated said first matrix of passwords, (d1) for transmitting a first pair of said passwords from its said first matrix to said remote station means when said remote station means attempts to gain access, said first pair of said passwords being chosen from different said columns and rows whereby they define diagonally opposite corners of a rectangle in said first virtual plane, (d2) for receiving a first pair of said passwords transmitted from said remote station means as obtained from said remote station means' said first matrix, (d3) for comparing said first pair of passwords transmitted from said remote station means to the said passwords located in said controlling computer means' said first matrix at corners of said rectangle other than those defined by said transmitted first pair of said passwords, (d4) for granting access if said compared passwords are a match, and (d5) for denying access if said compared passwords are not a match.

7. The security access control system of claim 6 wherein said access logic means additionally includes:

(a) means for marking ones of said passwords within the associated said first matrix employed for any purpose as "used"; and, (b) means for not choosing a said password marked as used for transmission to said remote station means.

8. The security access control system of claim 6 and additionally comprising:

(a) a pair of matching second matrices of passwords located at said controlling computer means and said remote station means, respectively, each said matrix of passwords comprising a plurality of individually unique symbols arranged in rows and columns to define a second virtual plane; and wherein said access logic means additionally includes, (b) secondary checking means disposed before said means for granting access if said compared passwords are a match, (b1) for transmitting a second pair of said passwords from its said second matrix to said remote station means, said second pair of said passwords being chosen from different said columns and rows whereby they define diagonally opposite corners of a rectangle in said second virtual plane which is located in a plane of a parallelepiped containing said compared and matched passwords at diagonal corners of one side thereof, (b2) for receiving a second pair of said passwords transmitted from said remote station means as obtained from said remote station means' said second matrix, (b3) for comparing said second pair of passwords transmitted from said remote station means to the said passwords located in said controlling computer means' said second matrix at corners of said rectangle other than those defined by said transmitted second pair of said passwords, (b4) for granting access if said compared second passwords are a match, and (b5) for denying access if said compared second passwords are not a match.

9. The security access control system of claim 8 wherein said access logic means additionally includes:
(a) means for marking ones of said passwords within the associated said second matrix employed for any purpose as "used"; and,
(b) means for not choosing a said password marked as used for transmission to said remote station means.

10. The security access control system of claim 6 and additionally comprising:
(a) a pair of matching second matrices of passwords located at said controlling computer means and said remote station means, respectively, each said second matrix of passwords comprising a plurality of individually unique symbols arranged in rows and columns to define a second virtual plane;
(b) said remote station means including query logic for transmitting a query pair of said passwords from its said first matrix to said controlling computer means to initiate an access attempt, said query pair of said passwords being chosen from different said columns and rows whereby they define diagonally opposite corners of a rectangle in said first virtual plane; and wherein said access logic means additionally includes,
(c) preliminary checking logic disposed before said means for transmitting a first pair of said passwords to said remote station means,
(c1) for receiving said query pair of said passwords transmitted from said remote station means,
(c2) for using said query pair of passwords transmitted from said remote station means to find the said passwords located in said controlling computer means' said first matrix at two corners of said rectangle other than those defined by said transmitted query pair of said passwords,
(c2) for transmitting said passwords from said two other corners to said remote station means, and wherein additionally,
(d) said first pair of said passwords is chosen from said controlling computer means' said first matrix, said first pair of said passwords being chosen from different said columns and rows whereby they define diagonally opposite corners of a rectangle in said second virtual plane which is located in a plane of a parallelepiped containing said four query passwords at corners of one side thereof.

11. In a security access control system wherein a user at a remote station requires approval from a controlling computer to gain access, the method of operation to improve the system's ability to defeat unauthorized access by eavesdroppers and the like comprising the steps of:
(a) providing a pair of matching first matrices of passwords at the controlling computer and the remote station, respectively, each first matrix of passwords comprising a plurality of individually unique symbols arranged in rows and columns to define a first virtual plane;
(b) providing access logic means at the controlling computer and operably connected to read from and write to its associated first matrix of passwords;
(c) transmitting a first pair of passwords from the controlling computer's first matrix to the remote station when the remote station attempts to gain access wherein the first pair of the passwords is chosen from different columns and rows whereby they define diagonally opposite corners of a rectangle in the first virtual plane,
(d) receiving a first pair of the passwords transmitted from the remote station as obtained from the remote station's first matrix,
(e) comparing the first pair of passwords transmitted from the remote station to the passwords located in the controlling computer's first matrix at corners of the rectangle other than those defined by the transmitted first pair of passwords;
(f) granting access if the compared passwords are a match; and,
(g) denying access if the compared passwords are not a match.

12. The method of claim 11 and additionally including the steps of:
(a) marking ones of the passwords within the associated first matrix employed for any purpose as "used"; and,
(b) not choosing a password marked as used for transmission to the remote station.

13. The method of claim 11 and additionally comprising the steps of:
(a) providing a pair of matching second matrices of passwords at the controlling computer and the remote station, respectively, wherein each second matrix of passwords comprises a plurality of individually unique symbols arranged in rows and columns to define a second virtual plane; and wherein before the granting of access if the compared passwords are a match there are the steps of,
(b) transmitting a second pair of passwords from the controlling computer's second matrix to the remote station wherein the second pair of passwords is chosen from different columns and rows whereby they define diagonally opposite corners of a rectangle in second virtual plane which is located in a plane of a parallelepiped containing the compared and matched passwords at diagonal corners of one side thereof;
(c) receiving a second pair of passwords transmitted from the remote station's second matrix;
(d) comparing the second pair of passwords transmitted from the remote station to the passwords located in the controlling computer's second matrix at corners of the rectangle other than those defined by the transmitted second pair of passwords;
(e) granting access if the compared second passwords are a match; and,
(f) denying access if the compared second passwords are not a match.

14. The method of claim 13 and additionally including the steps of:
(a) marking ones of the passwords within the associated second matrix employed for any purpose as "used"; and,
(b) not choosing a password marked as used for transmission to the remote station.

15. The method of claim 11 and additionally comprising the steps of:
(a) providing a pair of matching second matrices of passwords at the controlling computer and the remote station, respectively, each second matrix of passwords comprising a plurality of individually unique symbols arranged in rows and columns to define a second virtual plane;
(b) transmitting a query pair of the passwords from the remote station's first matrix to the controlling computer to initiate an access attempt wherein the query pair of the passwords is chosen from different columns and rows whereby they define diagonally opposite corners of a rectangle in the first virtual plane; and wherein before transmitting a first pair of the passwords to the remote station there are the steps of, (c) receiving the query pair of passwords transmitted from the remote station;

(d) using the query pair of passwords transmitted from the remote station to find the passwords located in the controlling computer's first matrix at two corners of the rectangle other than those defined by the transmitted query pair of passwords;

(e) transmitting the passwords from the two other corners to the remote station; and, (f) choosing the first pair of the passwords from the controlling computer's first matrix from different columns and rows whereby they define diagonally opposite corners of a rectangle in second virtual plane which is located in a plane of a parallelepiped containing the four query passwords at corners of one side thereof.

16. A security access control system comprising:
(a) controlling computer means for controlling access to an object;
(b) remote station means operably connected to said controlling computer means for inputting access controlling information to said controlling computer means;
(c) a pair of matching first matrices of passwords located at said controlling computer means and the remote station means, respectively, each said first matrix of passwords comprising a plurality of individually unique symbols arranged in rows and columns to define a first virtual plane; and,
(d) access logic means located at said controlling computer means and operably connected to read from and write to its associated said first matrix of passwords for transmitting portions of rectangularly oriented data in its said first matrix of passwords to said remote station means, for comparing non-transmitted portions of said rectangularly oriented data in its said first matrix of passwords to data transmitted to said controlling computer means by said remote station means from its associated said first matrix means and for granting access when said data from said remote station means properly matches said non-transmitted portions, said access logic means including logic for performing the steps of,
(d1) transmitting a first pair of said passwords from said controlling computer means's said first matrix to said remote station means when said remote station means attempts to gain access, said first pair of said passwords being chosen from different said columns and rows whereby they define diagonally opposite corners of a rectangle in said first virtual plane,
(d2) receiving a first pair of said passwords transmitted from said remote station means as obtained from said remote station means' said first matrix,
(d3) comparing said first pair of passwords transmitted from said remote station means to the said passwords located in said controlling computer means' said first matrix at corners of said rectangle other than those defined by said transmitted first pair of said passwords,
(d4) granting access if said compared passwords are a match, and (d5) denying access if said compared passwords are not a match.

17. The security access control system of claim 16 wherein said access logic means additionally includes logic for performing the steps of:
(a) marking ones of said passwords within the associated said first matrix employed for any purpose as "used"; and,
(b) not choosing a said password marked as used for transmission to said remote station means.

18. The security access control system of claim 16 and additionally comprising:
(a) a pair of matching second matrices of passwords located at said controlling computer means and said remote station means, respectively, each said second matrix of passwords comprising a plurality of individually unique symbols arranged in rows and columns to define a second virtual plane; and wherein said access logic means additionally includes logic for before granting access if said compared passwords are a match including the steps of,
(b) transmitting a second pair of said passwords from the controlling computer mean's said second matrix to said remote station means, said second pair of said passwords being chosen from different said columns and rows whereby they define diagonally opposite corners of a rectangle in said second virtual plane which is located in a plane of a parallelepiped containing said compared and matched passwords at diagonal corners of one side thereof;
(c) receiving a second pair of said passwords transmitted from said remote station means as obtained from said remote station means' said second matrix;
(d) comparing said second pair of passwords transmitted from said remote station means to the said passwords located in said controlling computer means' said second matrix at corners of said rectangle other than those defined by said transmitted second pair of said passwords;
(e) granting access if said compared second passwords are a match; and,
(f) denying access if said compared second passwords are not a match.

19. The security access control system of claim 16 wherein said access logic means additionally includes logic for performing the steps of:
(a) marking ones of said passwords within the associated said second matrix employed for any purpose as "used"; and,
(b) not choosing a said password marked as used for transmission to said remote station means.

20. The security access control system of claim 16 and additionally comprising:
(a) a pair of matching second matrices of passwords located at said controlling computer means and said remote station means, respectively, each said second matrix of passwords comprising a plurality of individually unique symbols arranged in rows and columns to define a second virtual plane;
(b) said remote station means including query logic for transmitting a query pair of said passwords from its said first matrix to said controlling computer means to initiate an access attempt, said query pair of said passwords being chosen from different said columns and rows whereby they define diagonally opposite corners of a rectangle in said first virtual plane; and wherein said access logic means additionally includes logic for before transmitting a first pair of said passwords to said remote station means including the steps of, (c) receiving said query pair of said passwords transmitted from said remote station means;

(d) using said query pair of passwords transmitted from said remote station means to find the said passwords located in said controlling computer means' said first matrix at two corners of said rectangle other than those defined by said transmitted query pair of said passwords;

(e) transmitting said passwords from said two other corners to said remote station means; and, (f) choosing said first pair of said passwords from said controlling computer means' said first matrix from different said columns and rows whereby they define diagonally opposite corners of a rectangle in said second virtual plane which is located in a plane of a parallelepiped containing said four query passwords at corners of one side thereof.

* * * * *